Sept. 30, 1958  S. SCHNELL  2,854,289
APPLICATION VALVE
Filed April 22, 1955
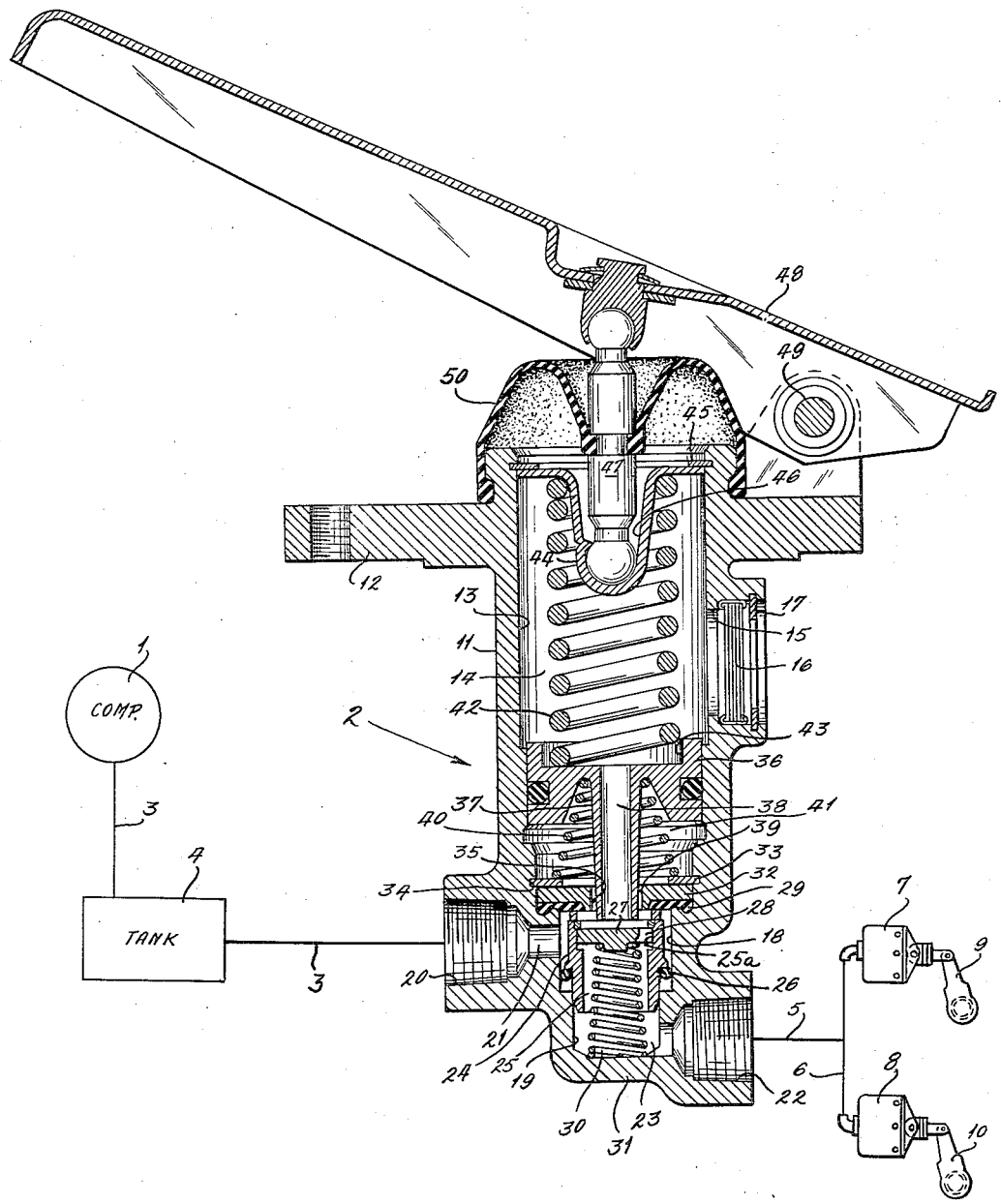
INVENTOR:
STEVE SCHNELL
By Gravely, Lieder, Woodruff & Wills
ATTORNEYS.

United States Patent Office 2,854,289
Patented Sept. 30, 1958

2,854,289

APPLICATION VALVE

Steve Schnell, St. Louis, Mo., assignor to Wagner Electric Corporation, St. Louis County, Mo., a corporation of Delaware Application April 22, 1955, Serial No. 503,209

4 Claims. (Cl. 303—54)

This invention relates to air brake systems and in particular to an application valve for controlling said systems.

One of the principal objects of the present invention is to provide an application valve having improved metering characteristics. Another object of the present invention is to provide an application valve which utilizes the effective metering area of both the piston and the exhaust stem thereby reducing the overall size of said valve. Another object is to provide serially actuated aligned tubular inlet and exhaust valves in a valve mechanism. Still another object of this invention is to provide an application valve in which the component parts are self-aligning. Still another object is to provide an application valve which is easily assembled and economically manufactured. These and other objects and advantages will become apparent hereinafter.

This invention is embodied in an application valve having a bore with inlet and outlet ports and an axially aligned counterbore with an exhaust port therein. A spring loaded piston is slidably received in the counterbore and is governed by an operator controlled spring and foot pedal. An integral tubular exhaust stem extends downwardly from said piston into a coaxial arrangement with a valve seat assembly positioned in the lower end of the counterbore. A spring loaded valve controllable by the tubular exhaust stem is slidably received in the bore of the application valve and is normally biased into a sealing engagement with the aforementioned valve seat assembly. The valve also supports a seating member for sealably engaging the lower end of the tubular exhaust stem. In this manner, the valve member normally seals the inlet port while affording communication between the exhaust and outlet port.

The invention also consists in the parts and in the arrangements and combinations of parts hereinafter described and claimed. In the accompanying drawing which forms part of this specification, Fig. 1 is a diagrammatic view of an air brake system having the preferred embodiment of the application valve therein shown partially in cross-section.

Referring now to the drawing in detail, the braking system comprises a pressure producing means or compressor 1 connected to the inlet of the application valve 2 by a conduit 3 having a supply tank or reservoir 4 interposed therein. The outlet of the application valve 2 is connected by conduits 5 and 6 to air or power cylinders 7 and 8 respectively which actuate their respective wheel brake assemblies (not shown) through linkages or slack adjusters 9 and 10.

The application valve 2 comprises a housing 11 with an integrally formed mounting flange 12 near the upper portion thereof. A counterbore 13, which forms an exhaust chamber 14, is provided in the housing 11 and has a substantially horizontal exhaust port 15 positioned substantially at the mid portion thereof, said exhaust port 15 being provided with a filter 16 retained therein by a snap ring 17. The counterbore 13 is axially aligned with an intermediate bore 18 and a bore 19 in the lower end of the housing 11. A substantially horizontal inlet port 20 intersects the mid portion of the intermediate bore 18 forming therewith an inlet chamber 21. An outlet port 22 is provided at the lower end of the bore 19, which forms an outlet chamber 23.

A tubular inlet or actuating valve 24 having a bore or exhaust passage 25 and an axially aligned counterbore 25a therein is slidably received in the bore 19 and extends coaxially into the intermediate bore 18. An O ring 26 provides a seal between said valve 24 and the wall of said intermediate bore 18. The tubular valve 24 carries an exhaust passage seating member 27 which is slidably retained in the counterbore 25a therein and which is provided with a plurality of passages 28 therethrough. The tubular valve 24 is biased into a sealing engagement with a resilient inlet valve seat 29 by a spring 30 positioned in said outlet chamber 23 between said seating member 27 and the end wall 31 of the bore 19. With the valve 24 normally seated, as hereinbefore described, the external effective areas thereof are balanced whereas the internal effective areas are unbalanced in a valve seating direction. However, when the valve 24 is unseated, as will be discussed later, both the external and the internal effective areas are balanced. The valve seat 29 and a seat back-up washer 32 are positioned and retained in the lower end of the counterbore 13 by a retainer 33 supported in a groove 34 in said counterbore 13, said washer 32 being provided with an opening or hole 35 therethrough. A piston 36 is slidably mounted in the counterbore 13 and is provided with a downwardly extending integrally formed tubular stem 37 having an exhaust passage 38 therethrough. The tubular exhaust stem 37 extends downwardly into a coaxial arrangement with the aperture 35 in the seat back-up washer 32 forming an annular or restricted passageway 39 therebetween since the outside diameter of the stem 37 is slightly smaller in diameter than the hole 35. The stem 37 also extends slightly into the upper end of the intermediate bore 18. A spring 40 is positioned in an equalizing chamber 41 between the retainer 33 and the piston 36 to bias the lower end of the stem 37 away from the co-operating seating member 27.

A force transmitting spring 42 is received in a recess 43 in the upper end of the piston 36 and is positioned between said piston 36 and a push rod socket member 44, which is slidably received in the counterbore 13 and retained therein by a snap ring 45 fixedly positioned in the upper end of said counterbore 13. The socket member 44 is provided with a deep recess 46 which pivotally retains one end of a push rod 47. The other end of said rod 47 is pivotally secured to a foot treadle 48 which in turn has its lower end pivotally secured to a pin 49 provided in the mounting flange 12. Consequently, the snap ring 45 not only retains the socket member 44 and the push rod 47 against displacement, but also limits the upward movement of the foot treadle 48. A protective resilient boot 50 is suitably arranged between the push rod 47 and the upper end of the housing 11 to prevent the entry of foreign particles into the counterbore 13.

Pressure fluid is normally discharged from the pressure producing means 1 to the inlet port 20 of the application valve 2 through the conduit 3 and the supply tank or reservoir 4. With the treadle 48 released, the component parts of the application valve 2 are in the positions shown in the drawing; that is, the tubular valve 24 is sealably engaged with its co-operating seat 29, and the valve stem 37 is open thereby providing communication between the power cylinders 7 and 8 and the exhaust port 15 leading to atmosphere. If the operator desires to apply a braking force, the exertion of said force on the push rod 47 from the treadle 48 is transmitted through the socket member 44 and the spring 42 causing the stem 37 to sealably engage the co-operating seating member 27. In this manner, the communication between the power cylinders 7 and 8 and the atmosphere is disrupted or cut off. Further downward movement of the push rod 47 overcomes the compressive force of the springs 30 and 40 and unseats the valve 24 from the seat 29 thereby allowing pressure fluid to flow through the passages 28 in the seating member 27 into the bore 19 and into the outlet port 22 and the conduits 5 and 6 respectively into the air cylinders 7 and 8 actuating the wheel brake assemblies (not shown) and effecting a braking of the vehicle. A portion of the flow of pressure fluid, however, will be communicated or "metered" through the annular metering passage 39 into the equalizing chamber 41 in the lower end of the counterbore 13. The metering passageway 39 provides a restriction preventing fluid pressure build-up in the lower end of the counterbore 13 ahead of the fluid pressure build-up in the air cylinders 7 and 8. As the pressure increases in the equalizing chamber 41, the pressure on the effective area of the piston 36 and the pressure in the bore 18 on the effective area of the seating member 27 when said member is engaged with the stem 37, plus the compressive forces of the springs 30 and 40, will cause the piston 36 to move upwardly against the spring 42. This reactionary force is resisted by the operator applied force causing the compression of the spring 42, said compression continuing until the upward force of the piston 36 equals the operator applied force. The balancing of forces will result in the stem 37 being moved into a "lapped" position with the valve seat 27 and the tubular valve 24 being momentarily moved into a "lapped" position with the valve seat 29. However, the pressure prevailing in the bore 19 will act upon the unbalanced internal effective areas of the valve 24 further urging said valve into sealable engagement with its seat 29, said stem 37 and valve seat 27 remaining in the aforementioned "lapped" position. In this position, the exhaust port 15 is closed to the outlet port 22 and the outlet port 22 is closed to the inlet port 20.

Should there be a leakage of fluid pressure from the brake system on the outlet side of the application valve, there would be an equal loss of fluid pressure in the lower end of the counterbore 13. This would cause an unbalancing of the reactionary force and the operator applied force thereby returning the stem 37 and the valve seat 27 to a "lapped" position without further action by the operator. If the operator elects to increase the intensity of the braking application, an increased applied force is transmitted to the piston 36, as previously described, unbalancing the forces and overcoming the compressive force of the springs 30 and 40 along with the additional force created by the pressure acting on the unbalanced internal effective areas of the valve 24 to unseat the valve 24 until the desired braking effort has been attained.

When the operator desires to release the brakes, the applied force is removed from the treadle 48 and push rod 47 which results in an immediate raising of the piston 36. This allows the valve 24 to remain sealably engaged with the valve seat 29 and disengages the lower end of the stem 37 from the co-operating seating member 27. The pressure fluid is thereby released from the power cylinders 7 and 8, and the equalizing chamber 41, through the passage 38 in the stem 37 into the exhaust chamber 14 and the exhaust port 15 to the atmosphere.

Among the obvious advantages of the present invention are the ease of assembly and the simplicity of manufacture. The application valve 2 is also provided with the feature of self-aligning component parts which is most conducive to maintenance and repair. It is to be noted that the piston 36 and the tubular valve 24 respectively are assembled or aligned with reference only to the counterbore 13 and the axially aligned bore 19.

Since the valve 24 has its external effective areas substantially balanced as aforementioned, the forces created by the fluid pressure acting on the various external areas of said valve 24 are opposing and self-cancelling. Therefore, the force seating the valve 24 is merely the light compressive force of the spring 30, the effect of atmospheric pressure on the unbalanced internal effective areas of said valve 24 being negligible. After the end of the stem 37 has been co-operatively engaged with the seating member 27, the operator applied force need only be increased to overcome the opposing compressive forces of the springs 30 and 40. No force is required to overcome any pressure from the reservoir 4 until the valve 24 is lowered from the seat 29, at which time only a small undetectable additional force equal to the fluid pressure multiplied by the area of that portion of the seating member 27 which covers the exhaust passage in the tubular stem 37 must be overcome. Therefore, the operator applied force does not encounter any substantial opposing forces effected by the fluid pressure tending to further seat the valve 24 upon the initial braking application. In this manner, it can be readily observed that the metering characteristics of the instant invention are greatly improved, especially since no large additional forces must be suddenly overcome when the inlet valve is opened.

Another advantage of the present invention is that the effective metering or reaction area of the piston 36 is supplemented by the effective metering or reaction area of the seating member 27 when sealably engaged with the end of the stem 37. Ordinary application valves depend only upon an effective annular metering area since the effective area of the stem employed therewith is always under tank pressure. In effect, the supplemental effective metering area of the seating member 27 allows a reduced diameter for the piston 36 and for the application valve 2 while attaining the same reactive metering force of ordinary application valves which customarily have a much larger annular effective metering area.

This invention is intended to cover all changes and modifications of the example of the invention herein chosen for purposes of the disclosure, which do not constitute departures from the spirit and scope of the invention.

What I claim is:

1. In a valve having a housing with an inlet port, an outlet port, and an exhaust port, there being a normally open communication between said outlet port and said exhaust port, and wherein a normally open exhaust valve closes before a normally closed inlet valve opens, the improvement which comprises the combination of movable means having a tubular exhaust stem extending therefrom, said tubular exhaust stem extending through an opening in an inlet valve seat, a tubular inlet valve having a passage therethrough normally biased against said inlet valve seat thereby preventing communication between said inlet port and said outlet port, said passage having an exhaust valve seat mounted therein in axial alignment with said exhaust stem and having a passage therethrough external of the exhaust valve stem seating area, whereby said exhaust stem is adapted to first close said exhaust valve to prevent communication between said outlet port and said exhaust port and then open said inlet valve to establish communication between said inlet port and said outlet port through said tubular inlet valve.

2. In a valve having a housing with an inlet port, and outlet port, and an exhaust port, there being a normally open communication between said outlet port and said exhaust port, and wherein a normally open exhaust valve closes before a normally closed inlet valve opens, the improvement which comprises the combination of a movable piston having a tubular exhaust stem with a passage extending therethrough, said tubular exhaust stem extending through an opening in an inlet valve seat, said opening being slightly larger than said exhaust stem to form a restricted passageway therebetween, a spring mounted between said movable piston and said inlet valve seat, a tubular inlet valve having a passage therethrough and an exhaust valve seat slidably mounted therein within limits in axial alignment with said tubular exhaust stem and positioned downwardly from the edge of said tubular inlet valve which normally abuts against said inlet valve seat, said exhaust valve seat having a passageway therethrough external of the exhaust valve stem seating area, a spring positioned between said exhaust valve seat and said housing for normally biasing said tubular inlet valve against said inlet valve seat thereby preventing communication between said inlet port and said outlet port, whereby said movable exhaust stem first closes said exhaust valve to prevent communication between said outlet port and said exhaust port and slides said exhaust valve in said tubular inlet valve to its limit and thereafter opens said inlet valve to establish communication between said inlet port and said outlet port through said tubular inlet valve.

3. An application valve comprising a housing having a substantially vertical bore with an inlet in the upper portion thereof and an outlet in the lower portion thereof, a counterbore axially aligned with said bore having an exhaust port herein, an inlet valve seat positioned at the juncture of said bore and said counterbore, said inlet valve seat having an opening therein, a piston slidably mounted in said counterbore having a tubular exhaust stem extending downwardly therefrom through said opening, exhaust stem having an exhaust passage therethrough, said piston biased from said inlet valve seat by a spring, a tubular inlet valve slidably mounted in said bore and normally biased to engage said inlet valve seat thereby normally preventing communication between said inlet port and outlet port, said tubular inlet valve having a passage therethrough and an exhaust valve seat slidably mounted therein within limits adapted to close the exhaust passage in said exhaust stem, said exhaust valve seat having a passage therethrough external of the exhaust valve stem seating area, a restricted passage between said bore and said counterbore, a spring operatively associated with said piston, and operator controlled means for actuating said spring, whereby upon actuation said tubular exhaust stem first closes said exhaust valve and slides said exhaust valve seat to its limit and thereafter opens said inlet valve to establish communication between said inlet and said outlet through the passage in said tubular inlet valve.

4. An application valve comprising a housing having an axially aligned bore and counterbore, said bore having an inlet port and an outlet port therein, said counterbore having an exhaust port therein, a piston slidably mounted in said counterbore having a tubular exhaust stem with a passage extending therethrough, an inlet valve seat secured to said housing having an opening for receiving said tubular exhaust stem and forming a restricted passageway therebetween, said tubular exhaust stem extending completely through said opening and into a tubular inlet valve, said tubular inlet valve having a passage therethrough and an exhaust valve seat slidably mounted therein adjacent to an abutment, said exhaust valve seat being in alignment with said tubular exhaust stem positioned downwardly from the edge of said tubular inlet valve which normally abuts against said inlet valve seat and having a passage therethrough external of the exhaust valve stem seating area, a spring positioned between said housing and said exhaust valve seat for normally biasing the tubular inlet valve against said inlet valve seat thereby normally preventing communication between said inlet port and said outlet port, whereby in operation the movement of said piston first moves said tubular exhaust stem against said exhaust valve seat to prevent communication between said outlet port and said exhaust port and slides said exhaust valve seat into abutting relation with said abutment and then moves said tubular inlet valve away from said inlet valve seat to establish communication between said inlet port and said outlet port through said tubular inlet valve.

References Cited in the file of this patent

UNITED STATES PATENTS

| 1,626,045 | Mitton | Apr. 26, 1927 |
| 2,395,401 | Eaton | Feb. 26, 1946 |
| 2,397,234 | Blake | Mar. 26, 1946 |
| 2,470,746 | Schultz | May 17, 1949 |
| 2,476,054 | Loweke | July 12, 1949 |
| 2,572,520 | Rockwell | Oct. 23, 1951 |

FOREIGN PATENTS

| 494,769 | Belgium | July 17, 1950 |
| 633,979 | France | Feb. 7, 1928 |
| 369,838 | Italy | Mar. 31, 1939 |

UNITED STATES PATENT OFFICE
CERTIFICATE OF CORRECTION

Patent No. 2,854,289

September 30, 1958

Steve Schnell

It is hereby certified that error appears in the printed specification of the above numbered patent requiring correction and that the said Letters Patent should read as corrected below.

Column 2, line 10, for "An 0" read -- An "O" --; column 5, line 12, for "passageway" read -- passage --; line 28, for "herein" read -- therein --; line 33, before "exhaust", first occurrence, insert -- said --.

Signed and sealed this 3rd day of February 1959.

(SEAL)
Attest:

KARL H. AXLINE
Attesting Officer

ROBERT C. WATSON
Commissioner of Patents